Figure 1:
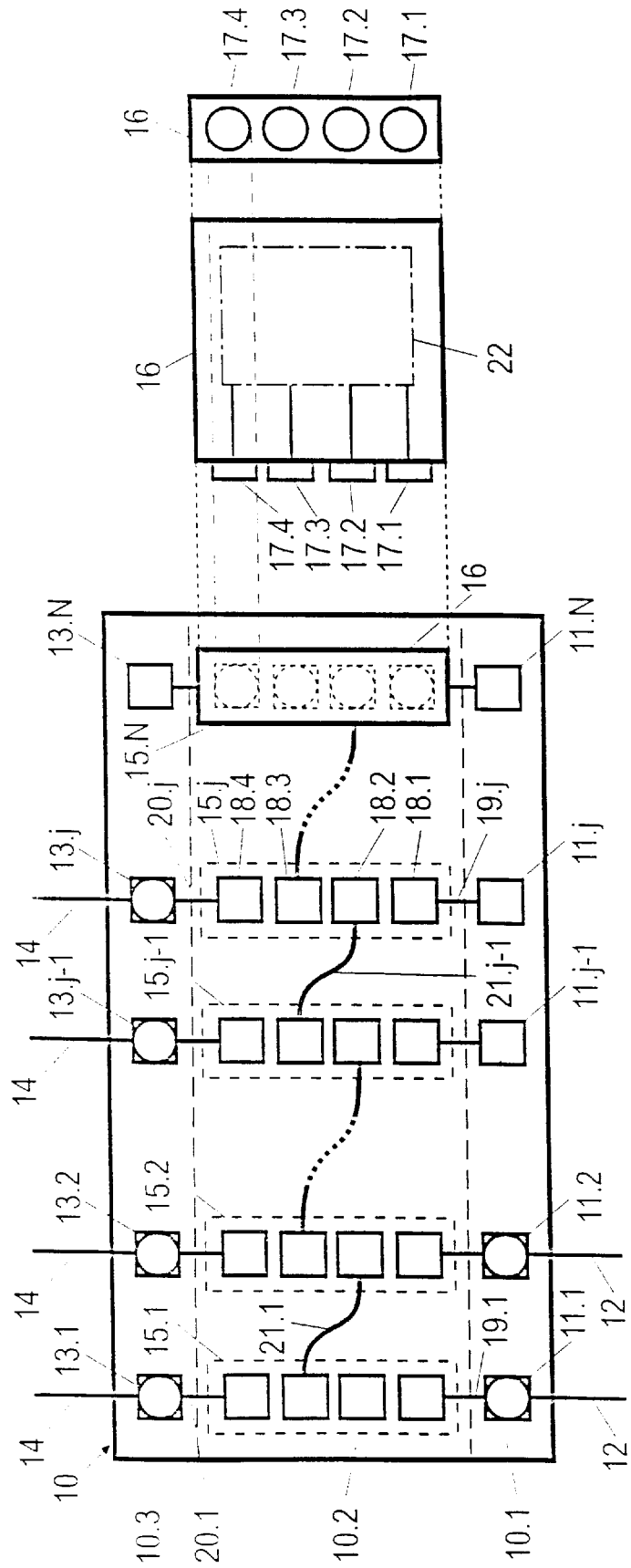

United States Patent [19]
Van Deventer

[11] Patent Number: 6,021,234
[45] Date of Patent: Feb. 1, 2000

[54] INTERCONNECTION APPARATUS HAVING AN ELECTRICAL OR OPTICAL SIGNAL BUS

[75] Inventor: Mattijs Oskar Van Deventer, Leidschendam, Netherlands

[73] Assignee: Koninklijke KPN N.V., Groningen, Netherlands

[21] Appl. No.: 09/087,912

[22] Filed: Jun. 1, 1998

[30] Foreign Application Priority Data

Jun. 5, 1997 [NL] Netherlands ............................ 1006239

[51] Int. Cl.[7] ...................................... G02B 6/28
[52] U.S. Cl. ............................................. 385/24
[58] Field of Search ................... 385/24, 147, 25; 395/500.05, 108, 500.17, 500.09, 500.13; 438/6, 619, 106; 250/559.21; 324/158.1; 326/44, 30; 174/261

[56] References Cited

U.S. PATENT DOCUMENTS

| | | | |
|---|---|---|---|
| 4,326,813 | 4/1982 | Lomicka, Jr. et al. | 395/108 |
| 4,432,761 | 2/1984 | Dawe | 250/559.21 |
| 5,130,988 | 7/1992 | Wilcox et al. | 395/500.05 |
| 5,432,708 | 7/1995 | Mohsen | 395/500.17 |
| 5,614,818 | 3/1997 | Ayat et al. | 324/158.1 |
| 5,843,799 | 12/1998 | Hsu et al. | 438/6 |

FOREIGN PATENT DOCUMENTS

| | | |
|---|---|---|
| 0 316 259 A2 | 5/1989 | European Pat. Off. . |
| 0 347 037 A2 | 12/1989 | European Pat. Off. . |
| 0 348 329 A2 | 12/1989 | European Pat. Off. . |
| 2 299 459 | 10/1996 | United Kingdom . |
| WO 95/20772 | 8/1995 | WIPO . |

OTHER PUBLICATIONS

R.C. Stanley, "Fiber Optic Local–Area Networks", Proceedings of the National Communications Forum, vol. 42, No. 1, Sep. 30, 1988, pp. 390–398.

G. Van Der Plas, "Apon: An ATM–based FITL system", EFOC & N '93, Optical Access Networks, paper 46, Jun. 30–Jul. 2, 1993, pp. 91–95.

M.O. Van Deventer, et al., "Architectures For 100 KM 2048 Split Bidirectional Superpons From Acts–Planet", Invited paper for SPIE symposium "All Optical Communication Systems", Boston, vol. 2919, invited paper 2919–25, Nov. 1996, pp. 1–12.

*Primary Examiner*—Akm E. Ullah
*Attorney, Agent, or Firm*—Oblon, Spivak, McClelland, Maier & Neustadt, P.C.

[57] ABSTRACT

An interconnect apparatus provides for optical and/or electric signal interconnections of a number of input ports from a row of N input ports (11.1–11.N) with a number of output ports from a row of N output ports (13.1–13.N) by way of a signal bus which is capable of being segmented. The apparatus comprises a rack structure (10) having a row of N circuit positions (15.1–15.N) for plugging in circuit modules (16), and a set of such circuit modules provided with signal circuits (22) having various bus functions, such as bus-input, bus-interconnect and bus-output functions. The signal bus comprises one or more disjunct bus segments, with each bus segment being capable of being composed of bus parts (11.j–1) between consecutive module positions (11.j–1, 11.j) and bus parts formed by the signal circuits of circuit modules (16) plugged into the module positions (15.j–1, 15.j) (where j=2, . . . ,N).

24 Claims, 8 Drawing Sheets

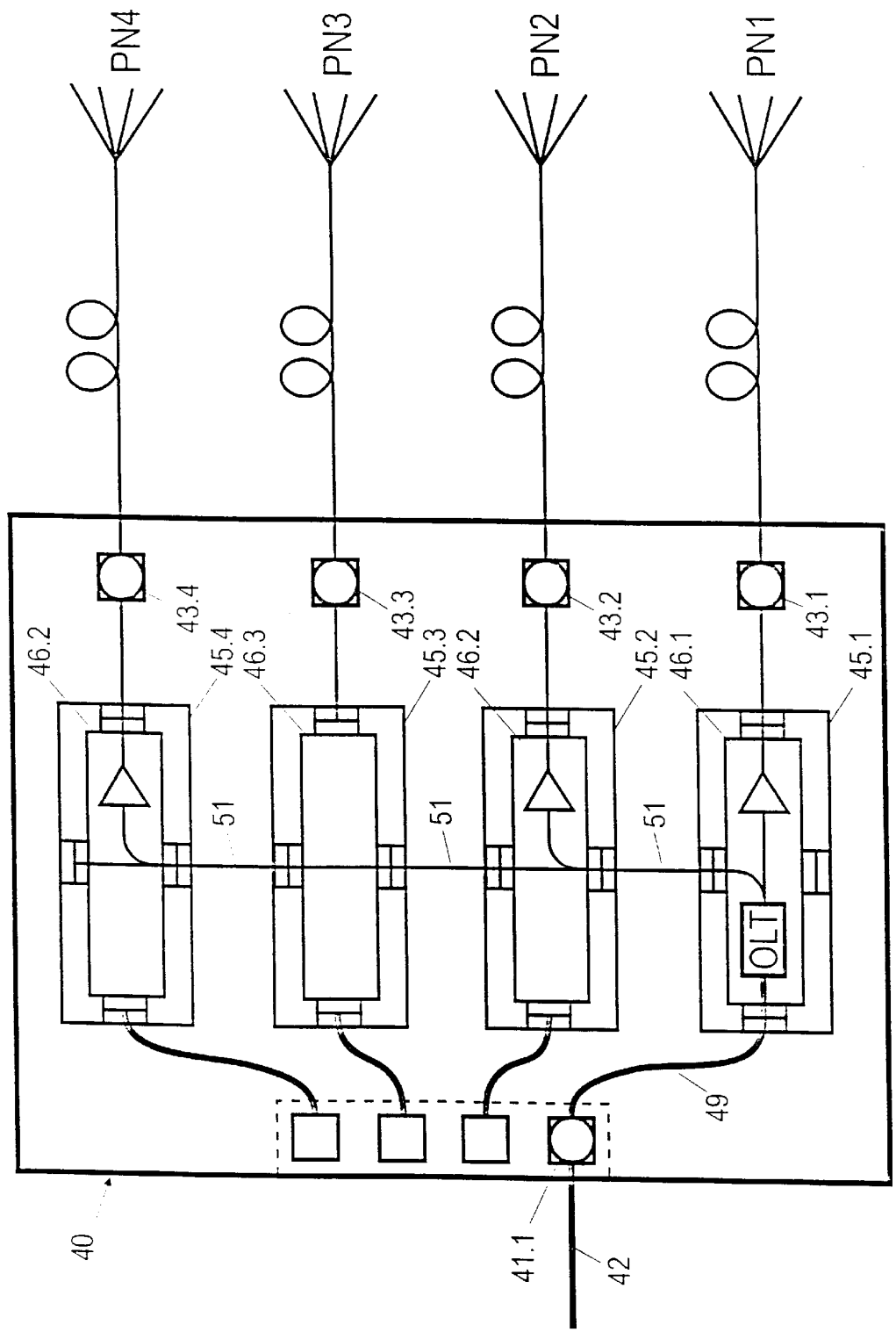
FIG. 5.1

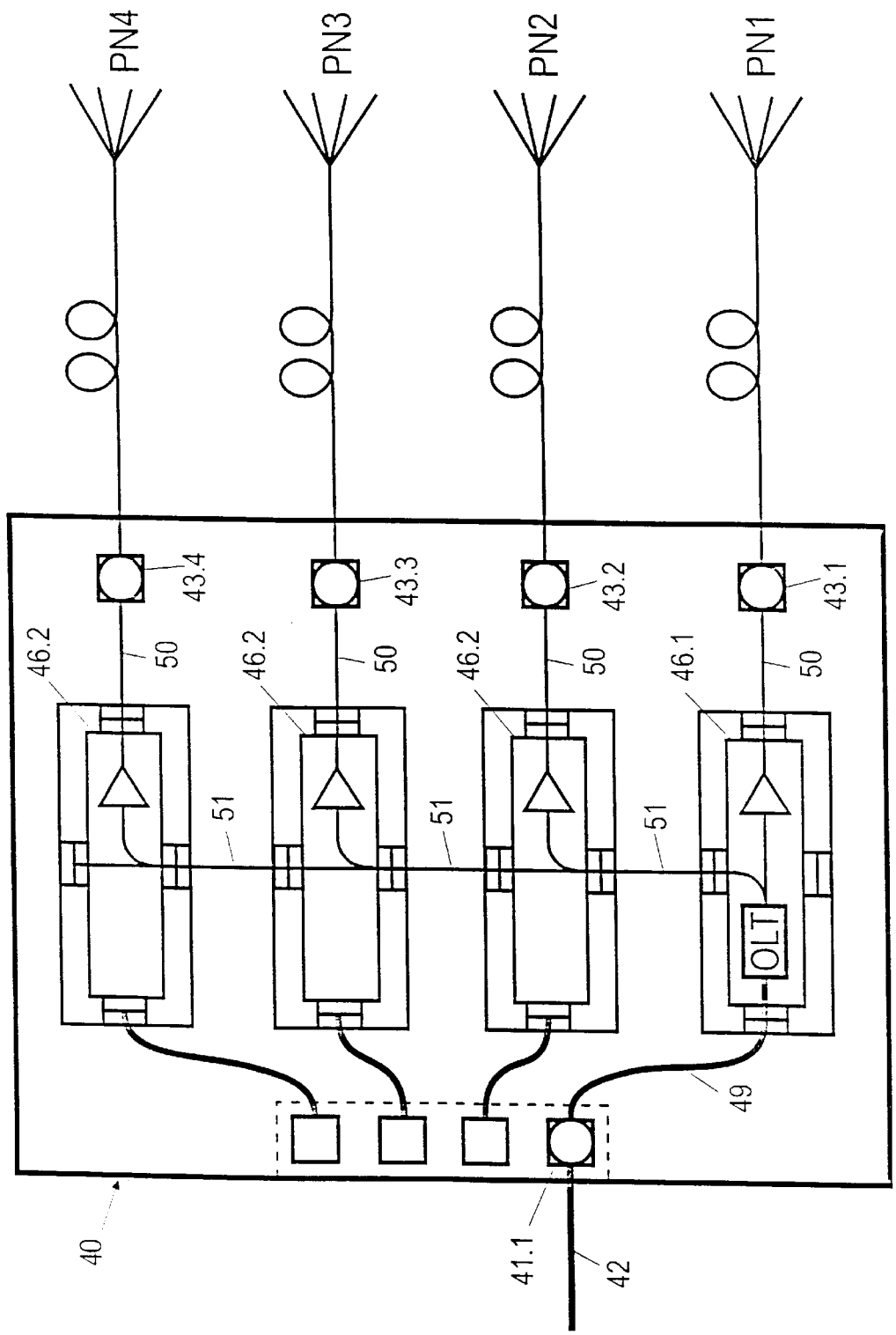
FIG. 5.2

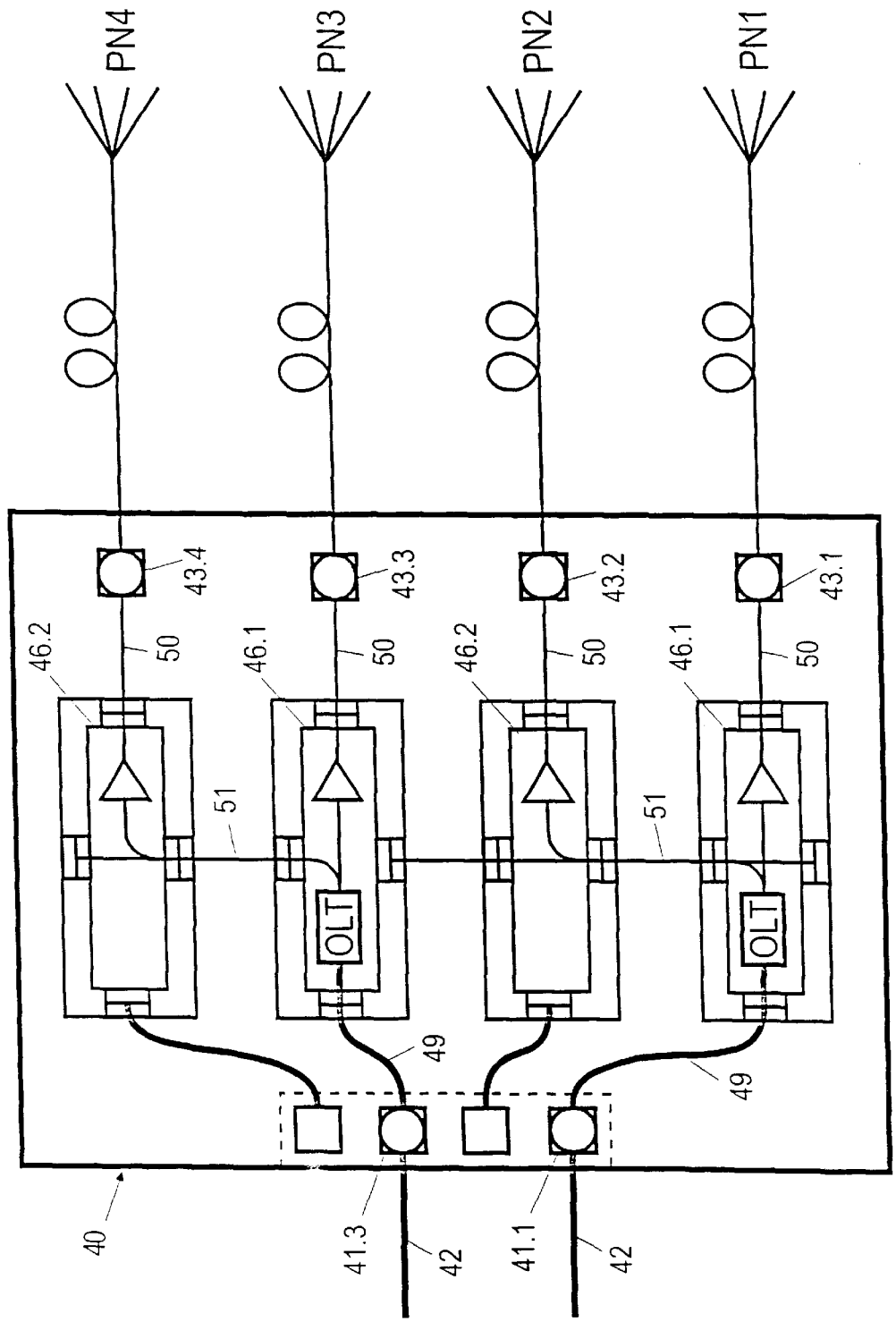
FIG. 5.3

INTERCONNECTION APPARATUS HAVING AN ELECTRICAL OR OPTICAL SIGNAL BUS

A. BACKGROUND OF THE INVENTION

1. Field of the Invention

The invention lies in the field of network structures for signal transmission such as, e.g., network structures based on passive optical networks (PONs), in which there are included network elements for setting up and maintaining interconnections between signal-transmission lines. More in particular, it relates to an interconnect apparatus for interconnecting at least one signal-input port with a number of signal-output ports by way of a signal bus.

2. Prior Art

Currently, network architectures are being developed which are called SuperPONs, as described in, e.g., reference [1]. A SuperPON is an APON (ATM over Passive Optical Networks) having optical amplifiers in order to make possible a high splitting rate and a wide range. An APON is a passive optical network in which signal transport takes place on the basis of ATM [=Asynchronous Transfer Mode], as described in, e.g., reference [2]. An essential "component" in a SuperPON is a local node having a combined amplification and splitting function. In such a local node, communication signals, which originate from a main node having a switching function and which are supplied by way of a "feeder", are amplified, if so required, and distributed among a number of passive optical networks having great numbers of connecting options for network users. The communication signals may be supplied as optical signals by way of an optical feeder. The communication signals may also be supplied as electric signals having, e.g., an SDH [=Synchronous Digital Hierarchy] transmission system as feeder, the local node also having an OLT function (OLT= Optical Line Termination). Networks of such size, however, require a high degree of flexibility regarding extendibility in numbers of connections and/or in capacity per connection. Said flexibility is particularly important for introducing wide-band services by way of optical links to home connections in the event of a rising number of users and a demand for more capacity per user. In addition, interrupt times in the event of implementing extensions should, if not be left out, at least be limited as far as possible. Such flexibility may be achieved if, in such a local node, there is placed an interconnect apparatus having an already-installed interconnect capacity which is tuned to the future, at any rate prepared for actual installation, of which capacity originally only a limited portion is used. One of the requirements here is that the interconnect apparatus permit segmentation of the original network, i.c. a SuperPON, in a relatively simple manner. This is to say that the network may be split up into two (or more) separate parts which by itself again form a network of the same type, in this case a SuperPON having its own connection to the feeder. In order to achieve flexibility in interconnection, there are known apparatus based on a rack structure, such as a backplane structure, provided with a signal bus and with a number of module positions. At said module positions, there may be plugged in circuit modules in the form of, e.g., plug-in boards, with electric and/or optical circuits having various signal-processing functions or I/O functions, as a result of which there are realised mutual interconnections between the circuit modules by way of the signal bus. Basically, the circuit modules are easy to exchange. Such an interconnect apparatus having an optical signal bus is disclosed in, e.g., reference [3]. Said optical signal bus consists of a number of parallel fibres in a backplane, on which there are coupled board-shaped circuit modules for mutual interconnection by way of specific connection blocks. An interconnect apparatus having such a signal bus, however, does not permit the desired segmentation in a simple manner.

B. SUMMARY OF THE INVENTION

The object of the invention is to provide for an interconnect apparatus of the above type, with which the desired segmentation may be realised in a relatively simple manner. In this connection, the invention is based on the combined insight that the signal bus need not be located entirely in the rack structure, and that the circuit modules may form exchangeable parts of the signal bus.

In order to achieve the envisaged object, an interconnect apparatus of a type according to the preamble of claim 1, and disclosed in reference [3], according to the invention is characterised as in claim 1.

In a first preferred embodiment, the interconnect apparatus is characterised as in claim 2. Thus, there may be realised bus segments having the most elementary bus functions.

In order to be able to plug a circuit module into a module position, the circuit modules and the module positions, respectively, are provided with a number of connectors and corresponding counterconnectors. In the event of a suitable coupling between the counterconnectors by way of the rack structure and between the connectors on the circuit modules, a number of four was found to be optimal. In a second preferred embodiment, therefore, the interconnect apparatus is characterised as in claim 3.

Furthermore, the invention provides for a circuit module for forming a bus part in an interconnect apparatus according to the invention, characterised as in claim 16.

Further preferred embodiments are summarised in further subclaims.

Reference [4] discloses a backplane structure on which circuit modules having varying functions may be plugged in. In this connection, the backplane provides for mutual interconnections between the various circuit modules. Each circuit module is provided with a separate port having an I/O function which, by way of the backplane, may be plugged in on an interconnect module for external connections. Furthermore, reference [5] discloses a rack structure having a backplane and a number of module positions on which circuit modules may be plugged in, the backplane being provided with electrically conducting print tracks for mutual interconnections between the circuit modules. A circuit module and a module position are provided with a specific optical connector-counterconnector pair, the counterconnectors of two consecutive module positions being optically interconnected by way of the rack structure. In references [4] and [5], however, there is no signal bus involved for the interconnections between the circuit modules by way of the backplane, let alone that the circuit modules have a signal-bus function.

C. REFERENCES

[1] M. O. van Deventer, et al., "Architectures for 100 km 2048 split bidirectional SuperPONs from ACTS-PLANET", SPIE vol. 2919, invited paper 2919–25, pp. 242–251, 1996;

[2] G. van der Plas, "APON: An ATM-based FITL system", EFOC & N '93, Optical Access Networks, paper 46, pp. 91–95, 1993;

[3] WO 95/20772;
[4] GB-A-2299459;
[5] EP-A-0347037.

The references are considered as being incorporated in the present application.

D. BRIEF DESCRIPTION OF THE DRAWING

Figure 2:
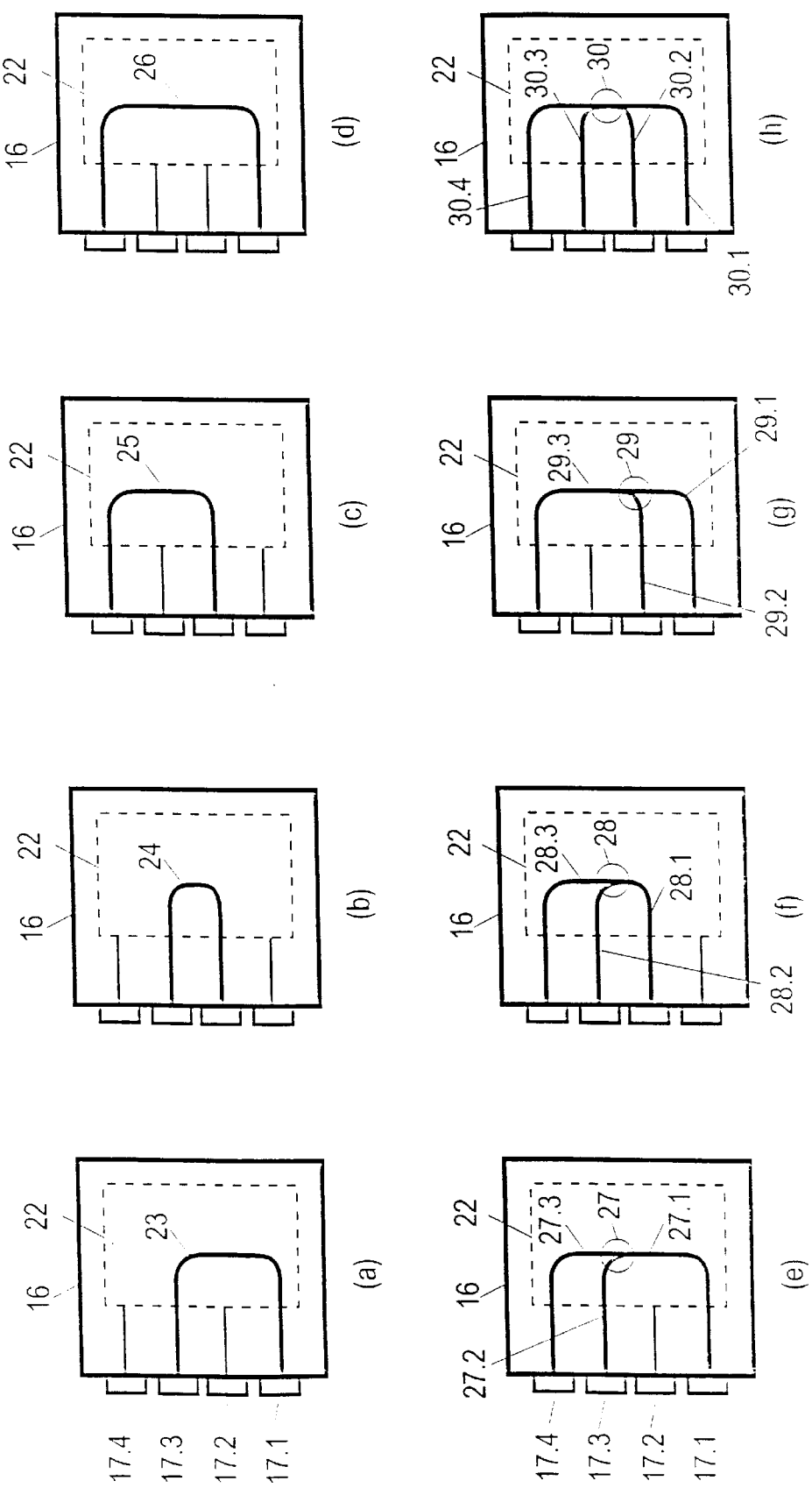
Figure 3:
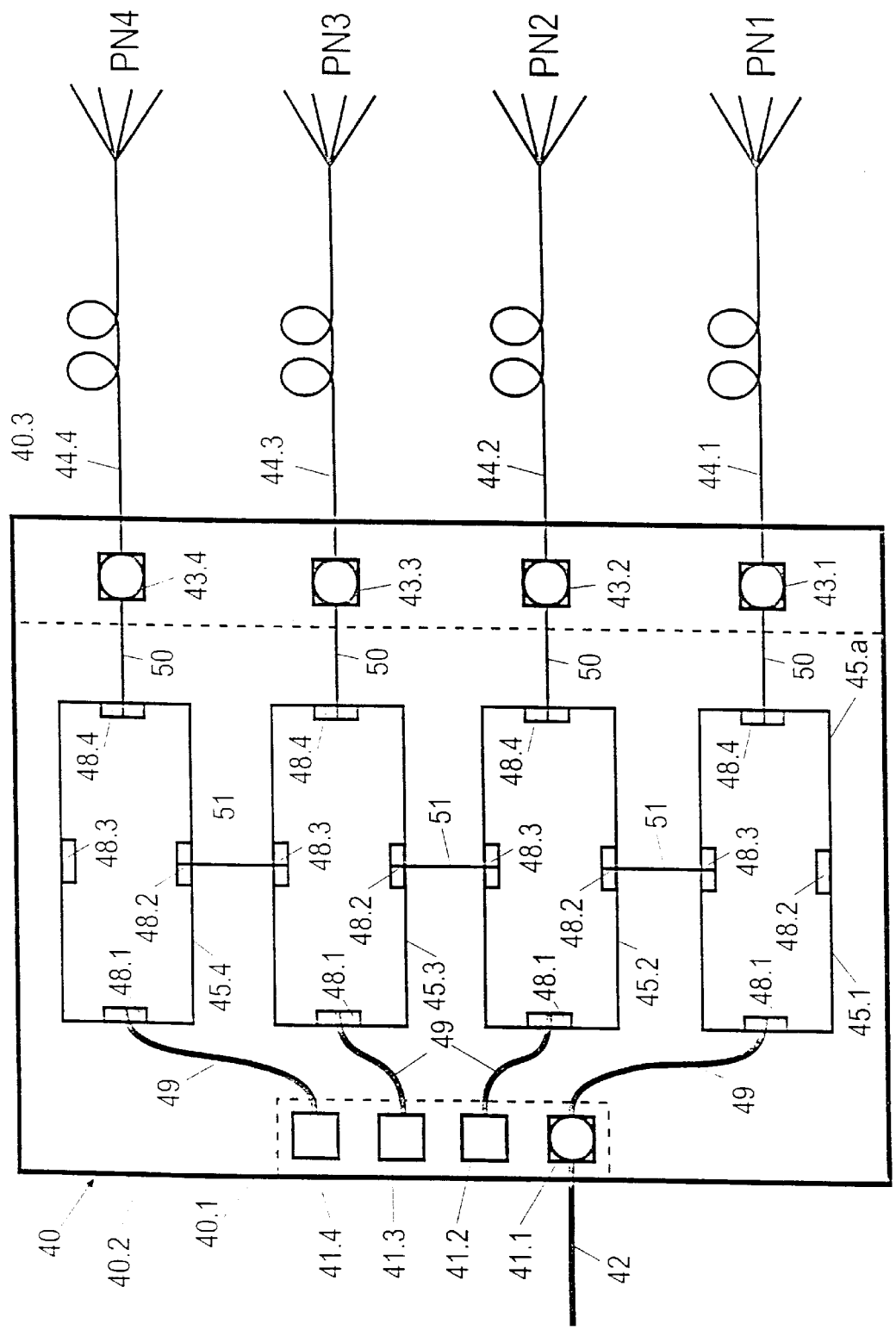
Figure 4:
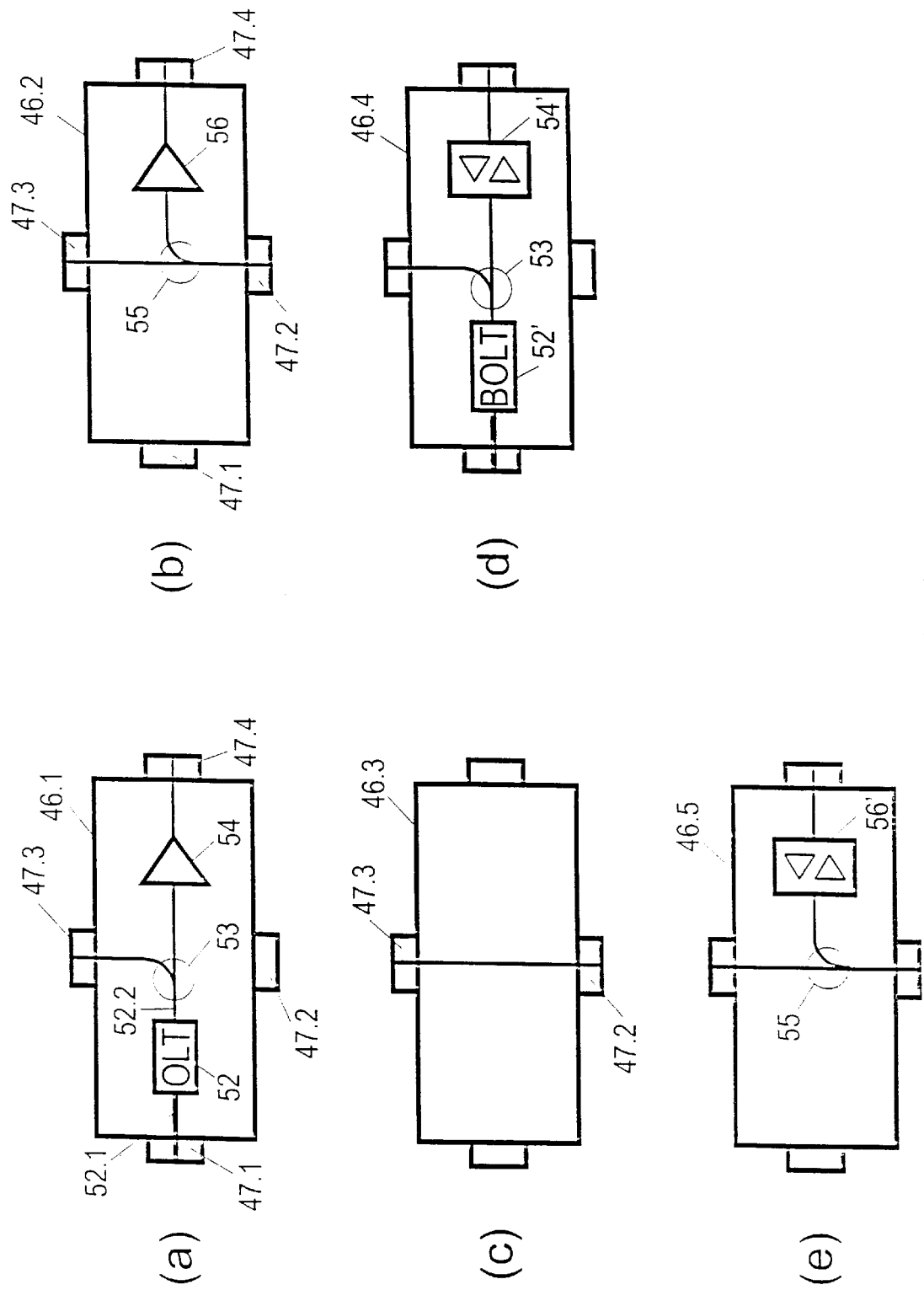
Figure 6:
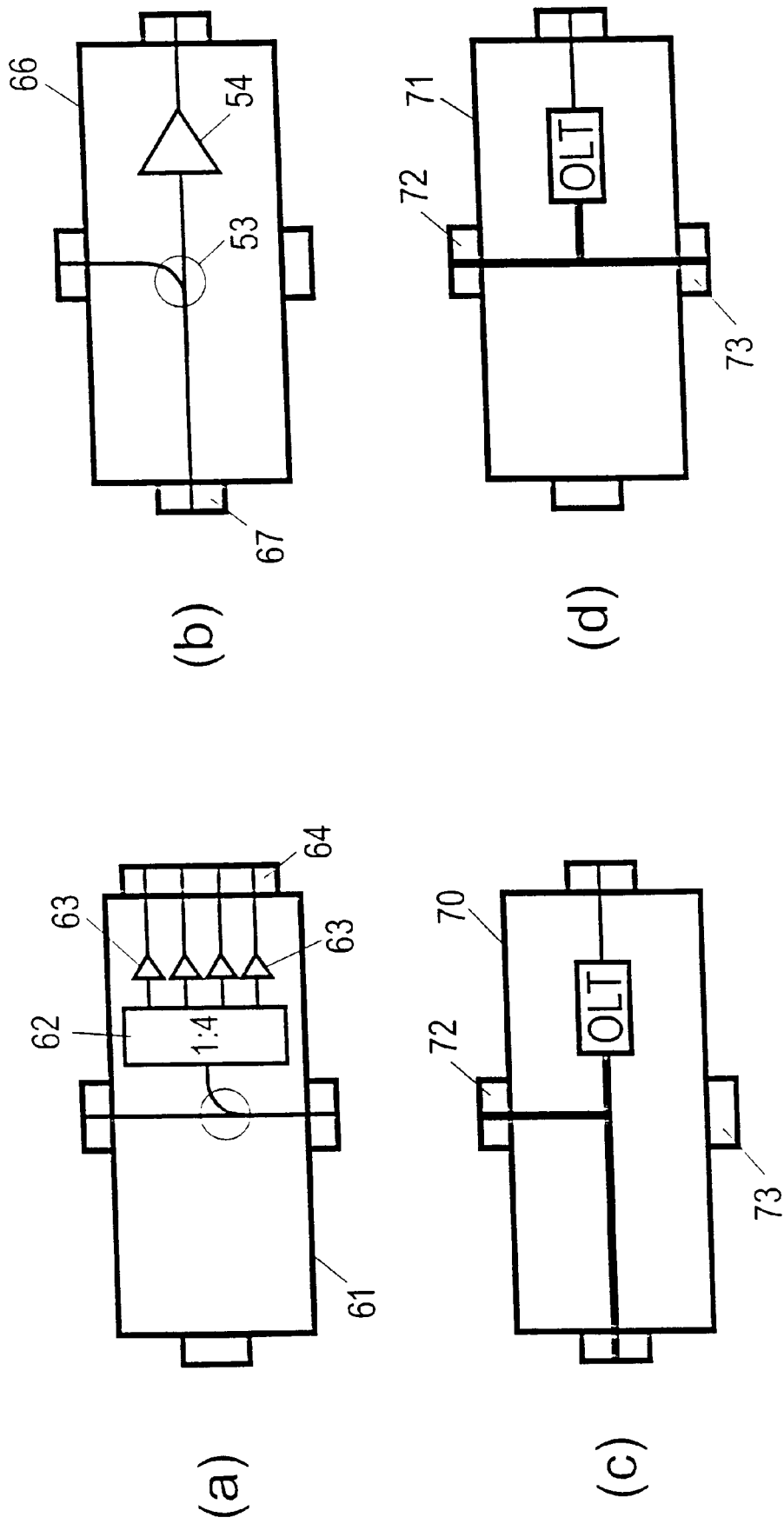

The invention will be explained in greater detail by reference to a drawing comprising the following figures:

FIG. 1 schematically shows a first exemplary embodiment of an interconnect apparatus according to the invention;

FIG. 2 schematically shows, in components (a) to (h) inclusive, eight types of circuit modules for an interconnect apparatus according to FIG. 1;

FIG. 3 schematically shows a second exemplary embodiment of the interconnect apparatus according to the invention, for application in a local node of a Super-PON without circuit modules;

FIG. 4 schematically shows, in components (a) to (e) inclusive, five circuit modules for the exemplary embodiment as shown in FIG. 3;

FIG. 5.1, FIG. 5.2 and FIG. 5.3 schematically show the interconnect apparatus for the exemplary embodiment of FIG. 3 having circuit modules for a first, a second and a third stage of interconnection, respectively;

FIG. 6 schematically shows, in components (a) to (d) inclusive, four further circuit modules for interconnect apparatus according to the invention.

E. DESCRIPTION OF EXEMPLARY EMBODIMENTS

FIG. 1 schematically shows a first exemplary embodiment of an interconnect apparatus according to the invention. It comprises a rack structure 10, which is subdivided into an input board 10.1, a backplane 10.2 and an output board 10.3. The input board is provided with N input ports 11.1 to 11.n inclusive, each suitable for connecting an incoming signal-transport line 12, and the output board is provided with the same number of output ports 13.1 to 13.N inclusive, each suitable for connecting outgoing signal-transport lines 14. The backplane is provided with a row of N module positions 15.1 to 15.N inclusive. Each module position 15.j (j=1,2, . . . ,N) is designed for plugging in a circuit module 16. To this end, a circuit module 16 is provided with four connectors 17.1 to 17.4 inclusive and a module position 15.j provided with four corresponding counterconnectors 18.1 to 18.4 inclusive. Of each module position 15.j (j=1, . . . ,N), the first counterconnector 18.1 is coupled, by way of a permanent connection 19.j in the rack structure 10, to a corresponding input port 11.j, and the fourth counterconnector 18.4 is coupled, by way of a permanent connection 20.j in the rack structure 10, to a corresponding output port 13.j. The second counterconnector 18.2 of each module position 15.j (for j=2, . . . ,N) is coupled, by way of a permanent connection 21.j−1 in the backplane 10.2, to the third counterconnector 18.3 of the preceding module position 15.(j−1) in the row of module positions.

With the interconnect apparatus, there are set up semi-permanent signal interconnections between an incoming transmission line connected to an input port and a number of outgoing transmission lines connected to separate output ports by way of a signal bus. In this connection, the signal bus is composed of permanent bus parts formed by permanent connections 21.j−1 between two consecutive circuit positions 15.j and 15.j−1 and semipermanent bus parts on plugged-in circuit modules 16. To this end, the interconnect apparatus comprises a set of circuit modules 16 which are subdivided into a number of types, according to the specific function which the type of circuit module fulfills as semi-permanent bus part. Each circuit module is provided with a circuit 22 which, apart from a signal-conducting function, may also have a signal-converting or signal-processing function (see below). FIG. 2 shows, in parts (a) to (h) inclusive, various types of circuit modules. A first type, in part (a), has a bus input function and to that end is provided with an interconnecting signal conductor 23 between the first connector 17.1 and the third connector 17.3. A second type, in part (b), has a bus interconnect function and to that end is provided with an interconnecting signal conductor 24 between the second connector 17.2 and the third connector 17.3. A third type, in part (c), has a bus output function and to that end is provided with an interconnecting signal conductor 25 between the second connector 17.2 and the fourth connector 17.4. A fourth type, in part (d), has a bus I/O function and to that end is provided with a signal conductor 26 which interconnects the first connector 17.1 with the fourth connector 17.4. Said four types represent four basic functions for composing a signal bus. The following types represent combined functions thereof. A fifth type, in part (e), has a combined bus input and bus output function, and to that end is provided with a signal distributor 27 which interconnects the first connector 17.1 by way of an input conductor 27.1 with the third connector 17.3 by way of a first output conductor 27.2, and with the fourth connector 17.4 by way of a second output conductor 27.3. A sixth type, in part (f), has a combined bus interconnect and bus output function, and to that end is provided with a signal distributor 28 which interconnects the second connector 17.2 by way of an input conductor 28.1 with the third connector 17.3 by way of a first output conductor 28.2, and with the fourth connector 17.4 by way of a second output conductor 28.3. Part (g) shows a seventh type which is a combination of the bus output function and the bus I/O function, and which to that end is provided with a signal combinator 29 which interconnects the first and the second connector by way of input conductors 29.1 and 29.2, respectively, with the fourth connector by way of an output conductor 29.3. Part (h) shows an eighth type which is a combination of all four basic functions, and which to that end is provided with a signal combinator/distributor 30 which interconnects the first and the second connector by way of input conductors 30.1 and 30.2 with the third and fourth connector by way of output conductors 30.3 and 30.4, respectively.

The various types of circuit modules are used as follows for composing a signal bus for interconnections between incoming signal-transport lines 12 connected to one or more input ports 11.1–11.N and outgoing signal-transport lines 14 connected to one or more output ports 13.1–13.N:

(a) The first type of circuit module is placed in circuit position 15.j (where j=1, . . . ,N−1), if an input port 11.j must be interconnected with at least one output port 13.k (where j<k≦N).

(b) The second type of circuit module is placed in circuit position 15.j (where j=2, . . . ,N−1), if at least one input port 11.k (where 1≦k<j) must be interconnected with at least one output port 13.m (where j<m≦N).

(c) The third type of circuit module is placed in circuit position 15.j (where j=2, . . . ,N−1), if at least one input port 11.k (where 1≦k<j) must still be interconnected with only the output port 13.j.

(d) The fourth type of circuit module is placed in circuit position 15.j (where j=1, . . . ,N), if the input port 11.j must only be interconnected with the output port 13.j.

(e) The fifth type of circuit module is placed in circuit position 15.j (where j=1, . . . ,N−1), if the input port 11.j must be interconnected with the output port 13.j and at least one subsequent output port 13.k (where j<k≦N).

(f) The sixth type of circuit module is placed in circuit position 15.j (where j=2, . . . ,N−1), if at least one input port 11.k (where k<j) must be interconnected with the output port 13.j and at least one subsequent output port 13.m (where j<m≦N).

(g) The seventh type of circuit module is placed in circuit position 15.j (where j=2, . . . ,N−1), if at least one input port 11.k (where 1≦k<j) and the input port 11.j must be interconnected with the output port 13.j.

(h) The eighth type of circuit module is placed in circuit position 15.j (where j=2, . . . ,N−1), if at least one input port 11.k (where 1≦k<j) and the input port 11.j must be interconnected with the output port 13.j and at least one subsequent output port 13.m (where j<m≦N).

With these types of circuit modules, there may be composed a long signal bus by utilising all N circuit positions, i.e., a signal bus consisting of one bus segment having a segment length N. To this end, there is placed, in the first circuit position 11.1, a circuit module of the first or the fifth type; there are placed, in the subsequent circuit positions 11.j (where 1<j<N), circuit modules of the second, sixth or eighth type; and there is finally placed, in the last circuit position 11.N, a circuit module of the third or the seventh type. The fourth type of circuit module represents the shortest signal bus—a signal bus having a segment length L=1. Each bus segment having a segment length L>1 may be segmented into two bus segments having segment lengths $L_1$ and $L_2$, for which $L_1+L_2 \leq L$, by removing and/or replacing a circuit module in at least one module position. Of course, there may also be joined two bus segments to form a longer bus segment by the addition of, or the replacement by, suitable types of circuit modules. Two rack structures, each with a row of module positions, may also be easily coupled, by way of an interconnection of the third counterconnector of the last module position in the row of the one rack structure to the second counterconnector of the first module position of the row of the other rack structure.

The signal bus, i.e., its constituent parts, may consist of singular signal conductors which may be optical or electric. The signal bus may also be formed from a bundle of conductors which may comprise electric and/or optical conductors. To this end, the connectors and counterconnectors used and the circuit modules should similarly be composed plurally.

The circuit modules are constructed as, e.g., a board or a printed circuit provided with peripheral connectors for electric and/or optical signal connections according to a technique known per se.

Below there is described, by reference to figures FIG. 3 to FIG. 6 inclusive, a second exemplary embodiment of the interconnect apparatus, for use in a local node of a Super-PON. Here, the interconnect apparatus has a signal-amplification and a signal-distribution function which may be easily extended and segmented as needed.

FIG. 3 schematically shows a rack structure 40 which is broken down into an input board 40.1, a middle board 40.2, and an output board 40.3. The input board 40.1 is provided with four input ports 41.1 to 41.4 inclusive. To the first input port 41.1, there is connected an electric transmission line 42 of a feeder. The output board 40.3 is provided with four output ports 43.1 to 43.4 inclusive, to which there are connected (optical) open feeders 44.1 to 44.4 inclusive of passive optical networks PN1 to PN4 inclusive. The middle board is provided with four module positions 45.1 to 45.4 inclusive. For clarity's sake, each module position is shown as a rectangular opening 45a in the rack structure 40, in which there may be placed a circuit module. Each module position is constructed for plugging in a circuit module of one of the types of circuit modules 46.1 to 46.5 inclusive, as shown in FIG. 4. To that end, each circuit module is provided with four connectors 47.1 to 47.4 inclusive, while the inner rim of the rectangular opening 45a is provided, on each side of the rectangle, with four corresponding counterconnectors 48.1 to 48.4 inclusive. The first connector-counterconnector pair 47.1–48.1 is electric, while the other pairs are optical. Of a module position 45.j (where j=1, . . . , 4), the first counterconnector 48.1 has a permanent electric connection 49 with the input port 41.j, and the fourth counterconnector 48.4 has a permanent optical connection 50 with the output port 43.j. Furthermore, the third counterconnector 48.3 of the module position 45.j (where j=1,2 or 3) has a permanent optical connection 51 with the second counterconnector 48.2 of the subsequent module position 45.j+1.

In FIG. 4 there are shown, in parts (a) to (e) inclusive, five different circuit modules 46.1 to 46.5 inclusive. The first circuit module 46.1 is of the fifth type (see part (e) of FIG. 2) and therefore has a combined bus-input and bus-output function. The circuit of the circuit module 46.1 comprises an OLT (Optical Line Termination) 52 which includes an E/O-transducer. An input 52.1 of the OLT is coupled to the first connector 47.1, and an output 52.2 of the OLT is coupled, over an optical splitter 53 on the one hand, to the third connector 47.3 and on the other hand, by way of an optical amplifier 54, to the fourth connector 47.4. The second circuit module 46.2 in part (b) of FIG. 4 is of the sixth type (see part (f) of FIG. 2) and therefore has a combined bus-interconnect and bus-output function. In the circuit of the circuit module 46.2, the second connector 47.2 is directly coupled, by way of an optical splitter 55, on the one hand to the third connector 47.3 and on the other hand, by way of an optical amplifier 56, to the fourth connector 47.4. The third circuit module 46.3 in part (c) is of the second type (see part (b) of FIG. 2) and therefore has a bus-interconnect function. In the circuit of the circuit module 46.3, the second connector 47.2 is coupled directly to the third connector 47.3. The fourth and fifth circuit modules 46.4 and 46.5, respectively, shown in parts (d) and (e) of FIG. 4, are bi-directional versions of the first and second circuit modules 46.1 and 46.2 respectively. To that end, the circuit module 46.4 comprises a bi-directional OLT 52' (designated by BOLT) and a bi-directional amplifier 54', and the circuit module 46.5 a bi-directional amplifier 56'.

FIGS. 5.1, 5.2 and 5.3 consecutively show three stages of extension. In a first stage, shown in FIG. 5.1, a transmission line 42 in the feeder (not shown) offers sufficient transmission capacity for connections of three passive optical networks PN1, PN2 and PN4, with network PN3 not yet being used. The interconnection of the first input port 41.1 with the output ports 43.1, 43.2 and 43.4 is realised with one bus segment (of length L=4), with all four module positions being utilised. In the module positions 45.1 to 45.4 inclusive, there are consecutively plugged in the circuit modules 46.1, 46.2, 46.3 and 46.2. In a second stage, the third network PN3 is connected as well. To this end, the circuit module 46.3 in module position 45.3 is replaced by a circuit module 46.2. Said second stage is shown in FIG. 5.2. Should, at any given moment, the transmission capacity of a single transmission line 42 in the feeder no longer suffice, there is connected a second transmission line 42 to, e.g., the third input port 41.3, and the signal bus existing in the interconnect apparatus is segmented into two bus segments of length L=2. This is done by replacing, in the third module position 45.3, the circuit module 46.2 by a circuit module 46.1. As a result, the output ports 43.3 and 43.4 are no longer interconnected with the first input port 41.1, but with the third input port 41.3. Said third stage is shown in FIG. 5.3.

For a SuperPON in which the optical parts are used bi-directionally, the corresponding bi-directional versions of the circuit modules should be used.

In the event of applications as shown in figures FIG. 3, 4 and 5.1 to 5.4 inclusive, in which there must always be formed disjunct interconnections (i.e., always one input port having a number of other output ports), the types of circuit modules shown in parts (g) and (h) of FIG. 2 are not necessary. If in the event of optical bus segments there are used reflection-free optical connectors and counterconnectors, the closing off of a bus segment requires no special measures.

In FIG. 6, in parts (a) to (d) inclusive there are additionally shown a few variants for circuit modules. Part (a) shows a first variant 61 for the circuit module 46.2 of FIG. 4, in which the singular amplifier 56 has been replaced by an optical (1:4)-splitter 62, or more generally a (1:M)-splitter (M=2,3, . . . ) having, in each output, a separate optical amplifier 63. The circuit module 61 has now been provided with a fourth connector 64 which is constructed in quadruple, or more generally in M-fold. For the application of such a circuit module, the corresponding counterconnector in a module position should also be constructed in quadruple, or more generally in M-fold. Part (b) shows a second variant 66 of the circuit module 46.1 (FIG. 4, part (a)), which does not include an OLT, and which has a first connector 67 which is optical. The second variant may be used in an interconnection apparatus, with the transmission lines of the feeder being optical connections. Parts (c) and (d) show variants 70 and 71, respectively, for the module circuits 46.1 and 46.2, in which the OLT function has now been placed in the bus output. In said variants, the second and the third connectors 72 and 73 are constructed electrically. For the application of the variants 70 and 71, the permanent interconnections (51 in FIG. 3) between the third and the second counterconnectors should also be constructed electrically.

I claim:

1. Interconnect apparatus for interconnecting at least one input port with a number of output ports by way of a signal bus, comprising:
    at least one input port for connecting an incoming signal-transport line,
    a number of output ports for connecting outgoing signal-transport lines,
    a set of functional circuit modules, and
    a rack structure provided with a row of N (N=2,3, 4, . . . ) module positions, each designed for plugging in a circuit module from the set of circuit modules,
wherein the signal bus comprises one or more disjunct bus segments, and that each bus segment may be composed of bus parts between module positions on the rack structure and bus parts on circuit modules plugged into one or more consecutive module positions from the set of circuit modules.

2. Interconnect apparatus according to claim 1, wherein the set of circuit modules comprises circuit modules provided with signal circuits for bus parts having a bus-input function, having a bus-interconnect function, and having a bus-output function.

3. Interconnect apparatus according to claim 2, characterised in
    that the interconnect apparatus comprises a row of N input ports and a row of N output ports;
    that each circuit module from the set of circuit modules is provided with a set of four connectors and each module position with a set of four corresponding counterconnectors, with a first connector corresponding to a first counterconnector, a second connector to a second counterconnector, etc.;
    that of a jth module position (j=1,2, . . . ,N)
        the first counterconnector is coupled, by way of the rack structure, to a jth input port,
        the second counterconnector is coupled, by way of the rack structure, to the third counterconnector of a (j−1)th module position from the row of N module positions (where j≠1), and
        the fourth counterconnector is coupled, by way of the rack structure, to a jth output port, and
    that a circuit module having a bus part for the bus-input function is provided with a signal circuit in which the first connector is coupled to the third connector, a circuit module having a bus part for the bus-interconnect function is provided with a signal circuit in which the second connector is coupled to the third connector, and a circuit module having a bus part for the bus-output function is provided with a signal circuit in which at least one connector of the first second connectors is coupled to the fourth connector.

4. Interconnect apparatus according to claim 1, 2 or 3, wherein the interconnections between the at least one input port and the output ports are bi-directional signal connections.

5. Interconnect apparatus according to claim 1, 2 or 3, wherein the input ports are optical signal-input ports and the output ports are optical signal-output ports, and that the bus parts include optical conductors.

6. Interconnect apparatus according to claim 5, wherein the set of circuit modules includes circuit modules provided with an optical amplifier.

7. Interconnect apparatus according to claim 5, wherein the set of circuit modules includes circuit modules having a bus part for a bus-output function provided with an optical-signal splitter with M (M=2,3, . . . ) outputs, and that the fourth connector of the circuit modules in question, the corresponding fourth counterconnector of the module positions into which the circuit modules in question may be plugged in, and the associated output ports are constructed M-fold.

8. Interconnect apparatus according to claim 7, wherein in each of the M outputs of the optical-signal splitter there is included an optical amplifier.

9. Interconnect apparatus according to claim 1, 2 or 3, wherein the input ports are electric signal-input ports and the output ports are optical signal-output ports, and that the set of circuit modules includes circuit modules provided with an E/O transducer.

10. Interconnect apparatus according to claim 9, wherein the circuit modules, provided with an E/O transducer and having a bus part for a bus-output function, further are provided with an optical amplifier.

11. Interconnect apparatus according to claim 9, wherein the circuit modules, provided with an E/O transducer and having a bus part for a bus-output function, further are provided with an optical-signal splitter with M (M=2, 3, ... ) outputs, and that the fourth connector of the circuit modules in question, the corresponding fourth counterconnector of the module positions into which the circuit modules in question may be plugged in, and the associated output ports are constructed M-fold.

12. Interconnect apparatus according to claim 2 or 3, wherein the input ports are designed for connecting signal-transport lines of a feeder of a SuperPON, and the output ports are designed for connecting open feeders of passive optical networks.

13. Interconnect apparatus according to claim 12, wherein the input ports are electric input ports, that the signal bus is an electric bus, and that the circuit modules having a bus part for a bus-output function are provided with an E/O transducer.

14. Interconnect apparatus according to claim 12, wherein the input ports are electric input ports, that the signal bus is an optical signal bus, and that the circuit modules having a bus part for a bus-input function are provided with an E/O transducer.

15. Interconnect apparatus according to claim 2, wherein the set of circuit modules comprises circuit modules provided with signal circuits for bus parts having a combination of at least two of said bus functions.

16. Circuit module for forming a bus part in an interconnect apparatus according to any of the claims 1–15, wherein the circuit module is provided with a set of four connectors for plugging, into a module position, the interconnect apparatus, and a signal circuit which, as a function of a bus function to be fulfilled by the bus part, provides for mutual signal connections between at least two of the set of four connectors.

17. Circuit module according to claim 16, wherein the connectors of the set of four connectors are optical connectors.

18. Circuit module according to claim 17, wherein the signal circuit includes an optical amplifier.

19. Circuit module according to claim 18, wherein the optical amplifier is a bi-directional amplifier.

20. Circuit module according to claim 16, wherein the set of four connectors includes at least one electric and one optical connector.

21. Circuit module according to claim 20, wherein the signal circuit includes an E/O transducer.

22. Circuit module according to claim 20, wherein the signal circuit includes an E/O transducer and an optical amplifier.

23. Circuit module according to claim 20, wherein the signal circuit includes a bi-directional E/O transducer and a bi-directional optical amplifier.

24. Circuit module according to any of the claims 16,–,23, wherein the signal circuit includes an optical signal splitter having M (M=2,3, ... ) outputs coupled to the at least one optical connector which is constructed M-fold.

* * * * *